April 6, 1948.　　　J. C. DE WEESE　　　2,439,244
FLUID SEAL FOR FITTINGS
Filed June 22, 1944　　　2 Sheets-Sheet 1

Inventor
JOSEPH C. DE WEESE

By Donald W. Farrington
Attorney

April 6, 1948.   J. C. DE WEESE   2,439,244
FLUID SEAL FOR FITTINGS
Filed June 22, 1944   2 Sheets-Sheet 2

Inventor
JOSEPH C. DE WEESE
By Donald W. Farrington
Attorney

Patented Apr. 6, 1948

2,439,244

UNITED STATES PATENT OFFICE 2,439,244

FLUID SEAL FOR FITTINGS

Joseph C. De Weese, Essex, Md., assignor to The Glenn L. Martin Company, Middle River, Md., a corporation of Maryland Application June 22, 1944, Serial No. 541,567

1 Claim. (Cl. 285—34)

This invention relates to tank fittings, and more particularly to a structure for supporting any form of fitting to the wall of a fuel tank wherein the fitting will be firmly positioned on the tank and the joint between the tank and the fitting will be leakproof.

An object of the invention is to provide means for attaching filler pipes, discharge lines, tank holding clips or other form of fittings to the wall of a tank, particularly to aircraft fuel tanks.

While many forms of attachment means have been heretofore proposed, the majority of these prior devices are either cumbersome, difficult to install and usually are not liquid-proof, particularly when the airplane is in a steep dive or inverted position, especially when modern aromatic fuels are used, which have very low surface tension and tend to seep through conventional joints with commonplace packing means.

A further object of this invention is to provide an absolute fluid-proof seal for the joining means between tank fittings and the tanks themselves, and furthermore, the present sealing means not only liquid-proofs the joint between the fitting and the tank, but also encompasses or covers the threaded joining means.

Figure 1:
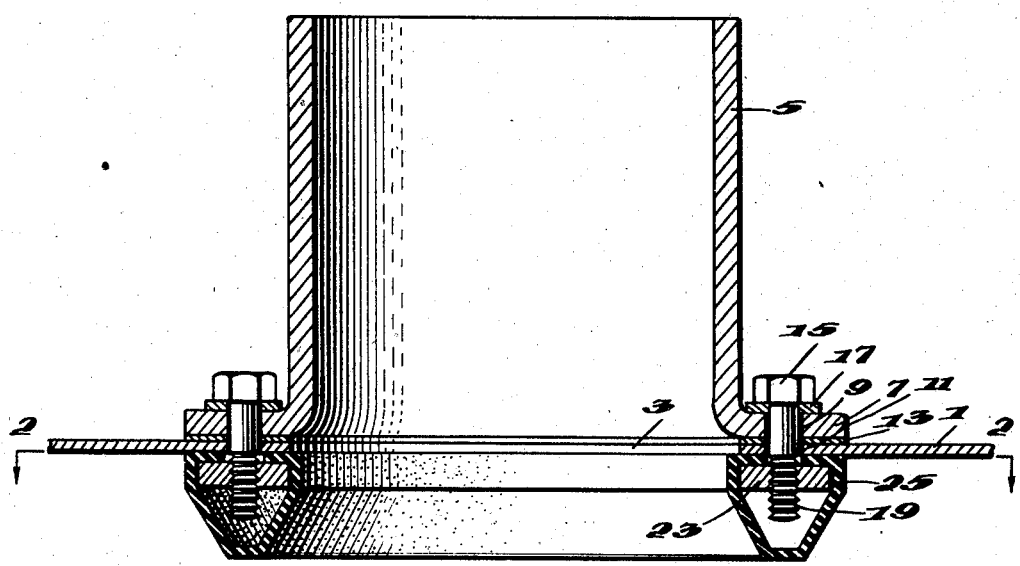
Fig. 1 is representative of a typical illustration of the present invention where a pipe, such as a filling connection, is attached in liquid-proof relation with a registering opening formed in the tank wall.
Figure 2:
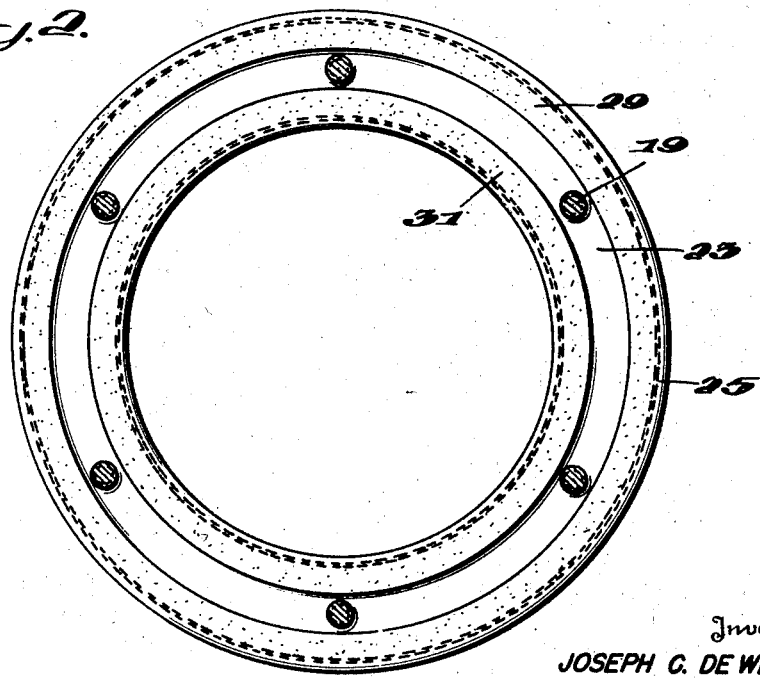
Fig. 2 is a horizontal cross-section of this particular form of fitting taken on line 2—2 of Fig. 1.

As before stated, the invention will be described with relation to a tank filler pipe, but it will be understood that the invention is applicable for forming a liquid-tight joint between any form of fitting attached to a tank and in its broadest concept relates to attaching a flanged member to a wall. In the several figures of the drawings numeral 1 denotes the wall of a container, such as an aircraft fuel tank, which is provided with a passage 3 cut therein and having an upstanding filler pipe connection 5 in registry with the tank opening 3. The filler pipe 5 is provided with an annular end flange 7 with a series of openings 9 circumferentially spaced around and through the flange. These openings 9, which may be of any desired number will cooperate and register with similar openings 11 formed in the tank wall 1. It is customary to place a joint gasket 13 between the underside of the fitting flange 7 and the outer surface of the tank wall 1.

Bolts or other elongated threaded fastening means 15, placed on flange washers 17, pass downwardly through the openings 9 and 11 of the previously described assembly into the interior of the tank 1 where the threaded portions 19 of the bolts 15 cooperate with and are threaded through screw threaded openings 21 circumferentially spaced around a ring member 23.

Figure 3:
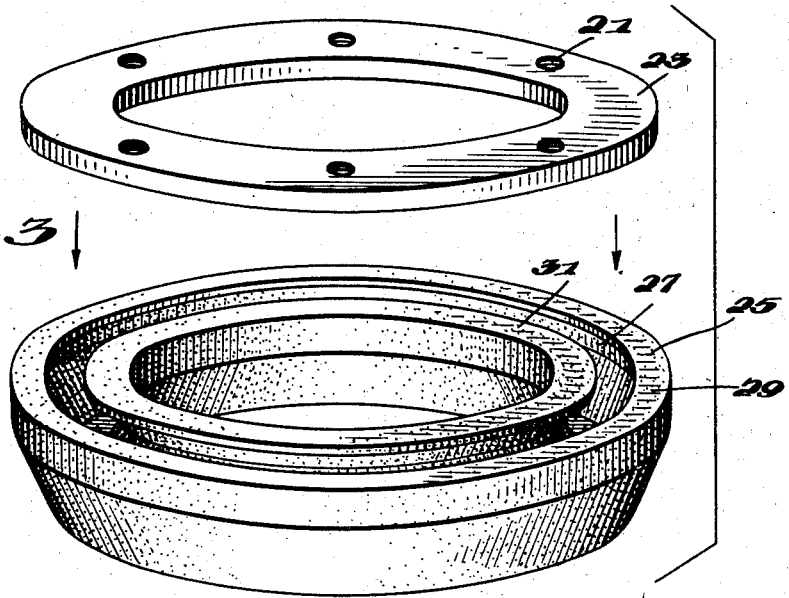
Fig. 3 is an enlarged perspective of the sealing ring per se and the normally enclosed cooperating metallic ring in unassembled position.

The liquid sealing means for the fitting joint is formed to prevent fuel or other liquid in the tank 1 from seeping out around the threaded bolts and the openings formed through the several units of the fitting is the salient feature of the present invention. This sealing means takes the form of a substantially C-shaped resilient ring 25, which is molded or otherwise fabricated from a resilient synthetic rubber or other resin which will chemically resist the action of the liquid in the tank. It will be observed that in the enlarged view of this sealing ring construction shown in Fig. 3 that the straight side of the C-shaped ring is split or grooved to provide a continuous opening 27 therein, which is of sufficient width to accommodate the diameter of the threaded bolt 15. The C-shaped ring is shown in several figures as somewhat angular, but it will be understood that the sealing ring may be more rounded, or, in fact, can consist of a ring-like member 25 of any configuration provided there is a flat surface for the continuous groove 27 therein and with free side portions 29—31.

The assembly and function of the sealing ring 25 will be obvious from a consideration of Fig. 1, which shows the inner solid flange ring 23 having threaded bolt receiving openings 21 therein substantially covered by the ring with the free side portions or ends 29 and 31 thereof abutting the inner surface of the tank wall 1. The resilient sealing member 25 with the inner ring 23 therein is placed in position around the opening 3 and the bolts 15 passing through the openings in the fitting flange 7, tank end, gaskets, etc., are secured in place by engagement of the threaded parts 19 and 21, thus compressing the side portions 29 and 31 of the ring by the tension applied through the bolts and ring 23. In practice it has been found that such a sealed joint defeats the seepage of gasoline or aromatic fuels as used in aircraft, and the hazard of leaking fuel has been completely eliminated, which is usually prevalent with conventional fittings when the plane is in steep ascent or descent.

Instead of a filling pipe 5 as illustrated, the fitting holding and sealing means disclosed and claimed herein is applicable to any type of bolted strip or clip, and, of course, where this form of fitting is used the tank wall 1 would be continuous and unapertured as at 3.

Figure 4:
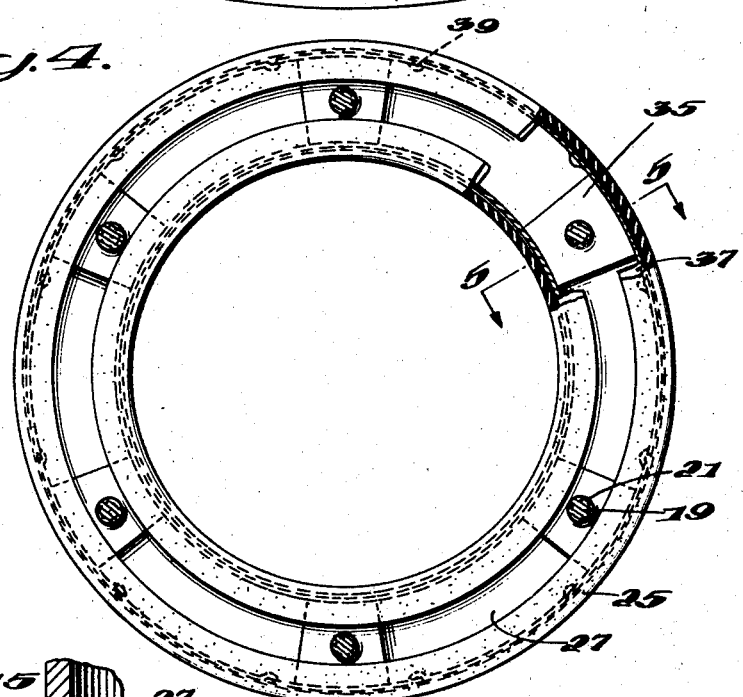
Fig. 4 is a horizontal cross-section of a modified form of cooperating ring member.
Figure 5:
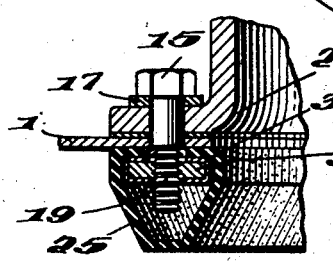
Fig. 5 is a vertical fragmental view taken on line 5—5 of Fig. 4 of this modified form of the invention.

Figs. 4 and 5 show a modified form of construction of the invention, where instead of using a continuous solid ring-like member 23 having threaded apertures 21 therein for cooperation with the screw threads 19 on the bolts 15 a series of threaded nuts 35 may be used which are approximately equally spaced throughout the circumference of a sheet metal retainer ring or cage 37. The ends of the ring or cage are bent over the inner and outer side edges of the nuts 35 and the nuts are restricted from free movement around the ring or cage by crimped indentations 39, while at the same time permitting the nuts to move to a limited degree to secure registry of the threaded apertures of the nuts with the cooperating threaded bolts 15.

When the parts are assembled as shown in the drawings any desired tension or compression may be placed on the side portions 29 and 31 of the C-shaped sealing ring so that regardless of what fuel is being handled in the tank or container the liquid-proof seal will prevent escape of the fuel or liquid around the fitting holding bolts. The seal ring 25 consequently serves as a fluid-proof gasket between the inner flange seal 23, the cage 37 and the container wall as well as a cover over the threaded ends of the bolts 15.

I claim:

In a fluidtight connection between a bolted pipe fitting and a fluid storage tank, including a plurality of bolts passing through an integral flange on the fitting and apertures in the tank and engaging a cooperating threaded ring member within the tank for drawing the fitting against the outside wall, and the ring member against the inside wall of the tank, the combination therewith of an endless, annular sealing member of rubber-like material surrounding and covering said threaded ring member and the ends of the bolts threaded therethrough, the free edges of said sealing member being clamped between the inner face of said ring member and the inner wall of the fuel tank to shield said ring member and bolt ends from contact with the liquid.

JOSEPH C. DE WEESE.

REFERENCES CITED

The following references are of record in the file of this patent:

UNITED STATES PATENTS

| Number | Name | Date |
|---|---|---|
| 1,689,575 | Winn | Oct. 30, 1928 |
| 2,130,017 | Lewis | Sept. 13, 1938 |
| 2,266,611 | Martin | Dec. 16, 1941 |